(12) United States Patent
Sappey et al.

(10) Patent No.: US 8,544,279 B2
(45) Date of Patent: Oct. 1, 2013

(54) METHOD AND APPARATUS FOR SPECTROSCOPIC MEASUREMENTS IN THE COMBUSTION ZONE OF A GAS TURBINE ENGINE

(75) Inventors: Andrew D. Sappey, Lakewood, CO (US); Bernard Patrick Masterson, Louisville, CO (US); Henrik Hofvander, Boulder, CO (US)

(73) Assignee: Zolo Technologies, Inc., Boulder, CO (US)

( * ) Notice: Subject to any disclaimer, the term of this patent is extended or adjusted under 35 U.S.C. 154(b) by 1295 days.

(21) Appl. No.: 12/092,673

(22) PCT Filed: Nov. 6, 2006

(86) PCT No.: PCT/US2006/060572
§ 371 (c)(1),
(2), (4) Date: May 5, 2008

(87) PCT Pub. No.: WO2007/087081
PCT Pub. Date: Aug. 2, 2007

(65) Prior Publication Data
US 2008/0289342 A1    Nov. 27, 2008

Related U.S. Application Data

(60) Provisional application No. 60/733,431, filed on Nov. 4, 2005.

(51) Int. Cl.
*F23N 5/08* (2006.01)
*F02C 9/00* (2006.01)

(52) U.S. Cl.
USPC ................ 60/772; 60/793; 431/75

(58) Field of Classification Search
USPC ............. 60/793, 772, 752–760; 356/432, 356/437, 43, 44; 431/18, 75, 79; 236/15 BB
See application file for complete search history.

(56) References Cited

U.S. PATENT DOCUMENTS

| 3,778,170 | A | 12/1973 | Howell et al. |
|---|---|---|---|
| 4,360,372 | A | 11/1982 | Maciejko et al. |

(Continued)

FOREIGN PATENT DOCUMENTS

| CN | 1343873 | 4/2002 |
|---|---|---|
| DE | 2730508 A1 | 1/1979 |

(Continued)

OTHER PUBLICATIONS

Settles, Gary S. et al., "Full Scale Schlieren Flow Visualization", Sep. 1995, Springer-Verlag, pp. 1-12.*

(Continued)

*Primary Examiner* — Andrew Nguyen
(74) *Attorney, Agent, or Firm* — Swanson & Bratschun, L.L.C.

(57) ABSTRACT

A method for measuring combustion parameters within a combustion zone of a gas turbine engine, the combustion zone being defined between an inner and outer casing. The method includes transmitting a beam from a transmit optic optically coupled to a bore in the outer casing off a portion of the inner casing and receiving a portion of the beam reflected off the inner casing with a receiving optic optically coupled to a bore in the outer casing. An apparatus for practicing the method includes a laser generating a beam and a transmitting/receiving optics pair, the transmitting/receiving optics pair being configured for operative association with a port in an outer casing of a gas turbine engine, whereby the transmitting/receiving optics are in optical communication by reflecting the beam off a portion of an inner casing.

17 Claims, 7 Drawing Sheets

(56) References Cited

U.S. PATENT DOCUMENTS

| | | | |
|---|---|---|---|
| 4,573,761 A | 3/1986 | McLachlan | |
| 4,659,195 A | 4/1987 | D'Amelio et al. | |
| 4,712,888 A * | 12/1987 | Brooks | 359/223.1 |
| 4,790,652 A * | 12/1988 | Uneus et al. | 356/45 |
| 4,895,421 A | 1/1990 | Kim et al. | |
| 4,915,468 A | 4/1990 | Kim et al. | |
| 4,980,763 A | 12/1990 | Lia | |
| 4,989,979 A | 2/1991 | Buckman | |
| 5,030,000 A | 7/1991 | Kanda | |
| 5,042,905 A | 8/1991 | Anjan | |
| 5,396,506 A | 3/1995 | Ball | |
| 5,448,071 A | 9/1995 | Mccaul et al. | |
| 5,477,323 A | 12/1995 | Andrews et al. | |
| 5,506,721 A | 4/1996 | Hikami et al. | |
| 5,515,158 A * | 5/1996 | Heineck | 356/129 |
| 5,621,213 A | 4/1997 | Barshad | |
| 5,627,934 A | 5/1997 | Muhs | |
| 5,717,209 A | 2/1998 | Bigman et al. | |
| 5,748,325 A | 5/1998 | Tulip | |
| 5,774,610 A | 6/1998 | O'Rourke | |
| 5,798,840 A | 8/1998 | Beiting | |
| 5,802,222 A | 9/1998 | Rasch et al. | |
| 5,813,767 A | 9/1998 | Calabro et al. | |
| 5,828,797 A | 10/1998 | Minott | |
| 5,841,546 A | 11/1998 | Carangelo et al. | |
| 5,960,129 A | 9/1999 | Kleinschmitt | |
| 5,993,194 A | 11/1999 | Lemelson et al. | |
| 6,016,372 A | 1/2000 | Fein et al. | |
| 6,150,661 A | 11/2000 | Mccaul et al. | |
| 6,160,255 A | 12/2000 | Sausa | |
| 6,345,134 B1 | 2/2002 | Laming et al. | |
| 6,455,851 B1 | 9/2002 | Lord et al. | |
| 6,519,385 B1 | 2/2003 | Green | |
| 6,593,573 B1 | 7/2003 | Mccann et al. | |
| 6,766,070 B2 | 7/2004 | Williams et al. | |
| 6,791,689 B1 | 9/2004 | Weckström | |
| 7,075,629 B2 * | 7/2006 | Bonne et al. | 356/43 |
| 7,075,653 B1 | 7/2006 | Rutherford | |
| 7,080,504 B2 * | 7/2006 | Pais | 60/203.1 |
| 2002/0031737 A1 | 3/2002 | Von Drasek et al. | |
| 2002/0158202 A1 | 10/2002 | Webber | |
| 2002/0181856 A1 | 12/2002 | Sappey et al. | |
| 2004/0019283 A1 | 1/2004 | Lambert et al. | |
| 2004/0065439 A1 | 4/2004 | Tubel | |
| 2005/0191755 A1 | 9/2005 | Balbach | |
| 2006/0032471 A1 | 2/2006 | Yalin | |
| 2006/0087655 A1 | 4/2006 | Augustine et al. | |
| 2006/0157239 A1 | 7/2006 | Ramos | |
| 2006/0176486 A1 | 8/2006 | Ho | |
| 2006/0243931 A1 | 11/2006 | Haran | |
| 2007/0133921 A1 | 6/2007 | Haffner | |
| 2007/0148478 A1 | 6/2007 | Schmitz | |
| 2007/0296966 A1 | 12/2007 | Benicewicz | |
| 2008/0002186 A1 | 1/2008 | Masterson et al. | |
| 2008/0262359 A1 | 10/2008 | Tearney et al. | |
| 2008/0289342 A1 | 11/2008 | Sappey | |
| 2009/0002684 A1 | 1/2009 | Sanders | |
| 2009/0207413 A1 | 8/2009 | Carpenter | |
| 2010/0068871 A1 | 3/2010 | Tian et al. | |

FOREIGN PATENT DOCUMENTS

| | | |
|---|---|---|
| EP | 0766080 A1 | 4/1997 |
| EP | 1205736 A | 5/2002 |
| JP | 2003-322568 | 11/2003 |
| JP | 2004-204787 | 7/2004 |
| JP | 2004204787 A | 7/2004 |
| KR | 10-2006-0008314 | 1/2006 |
| WO | 00/28304 A | 5/2000 |
| WO | WO 2004/051211 | 6/2004 |
| WO | WO 2004/090496 | 10/2004 |
| WO | WO 2007/087081 | 8/2007 |

OTHER PUBLICATIONS

International Search Report and Written Opinion from PCT/US08/079935, dated Aug. 21, 2009.

Allen (1998) "Diode laser absorption sensors for gas-dynamic and combustion flows" Measuring Science and Technology 9:545.

Allen et al. (2002) "Tunable Diode Laser Sensing and Combustion Control" Applied Combustion Diagnostics, chapter 18.

Baer et al. (1994) "Multiplexed Diode-Laser Sensor System for Simultaneous H20, 02, and Temperature Measurements" Optics Letters 19(22):1900-1902.

Docquier and Candel (2002) "Combustion control and sensors: a review" Progress in Energy and Combustion Science 28, 107-150.

Ebert et al. (1998) "Simultaneous Laser-Based in situ Detection of Oxygen and Water in a Waste Incinerator for Active Combustion Control Purposes" 27th Symposium on Combustion pp. 1301-1308.

Ebert et al. (2000) "Simultaneous Diode-Laser-Based In Situ Detection of Multiple Species and Temperature in a Gas-Fired Power Plant" Proceedings of the Combustion Institute 28:423.

Ebert et al. (2000) "The Use of Lasers as the Basis for Combustion Equipment Control" at TOTem, Intelligent Combustion Control pp. 1-15.

Furlong et al. (1998) "Diode Laser Sensors for Real-Time Control of Pulsed Combustion Systems": AIAA/SAE/ASME/ASEE Joint Propulsion Conference and Exhibit, pp. 1-8, 1, XP001148178.

Furlong et al. (1998) "Real-Time Adaptive Combustion Control Using Diode-Laser Absorption Sensors," 27th Symposium on Combustion pp. 103-111.

International Search Report and Written Opinion from PCT/US06/60572, dated Mar. 6, 2008.

International Search Report from PCT/US2008/079962, dated Feb. 27, 2009.

International Search Report and Written Opinion from PCT/US10/020132, dated Oct. 8, 2010.

International Search Report and Written Opinion from PCT/US10/045077, dated Oct. 4, 2010.

Liu et al. (2003) "Diode Laser Absorption Diagnostics for Measurements in Practical Combustion Flow Fields" 39th AIAA/ASME/SAE/ASEE Joint Propulsion Conference and Exhibit, Paper No. AIAA-2003-4581 pp. 1-6.

Miller et al. (1996) "Diode laser-based air mass flux sensor for subsonic aeropropulsion inlets" Applied Optics 35:4905.

Office Action dated Apr. 6, 2009 from the corresponding European application No. 06850383.8.

Ouyang et al. (1992) "Tomographic Absorption Spectroscopy of Combustion Gases using Tunable Infrared Diode Lasers," Paper No. 1637-20, SPIE Conference on Environmental and Process Monitoring Technologies, pp. 163-172.

Phillippe et al. (1993) "Laser diode wavelength-modulation spectroscopy for simultaneous measurement of temperature, pressure, and velocity in shock-heated oxygen flows" Applied Optics 32:6090.

Sanders et al. (2000) "Diode-Laser Sensor for Monitoring Multiple Combustion Parameters in Pulse Detonation Engines" Proceedings of the Combustion Institute 28:587.

Sanders et al. (2001) "Diode-laser absorption sensor for line-of-sight gas temperature distributions" Applied Optics 40:4404.

Supplemental European Search Report for Application No. EP 06850383, mailed on Mar. 5, 2009.

Teichert et al. (2003) "Simultaneous in situ measurement of CO H2O, and gas temperatures in a full-sized coal-fired power plant by near-infrared diode lasers" Applied Optics 42:2043.

Upschulte et al. (1999) "Measurements of CO, CO2, OH, and H2O in room-temperature and combustion gases by use of a broadly current-tuned multisection InGaAsP diode laser" Applied Optics 38:1506.

Varghese et al. (1997) "Temperature and CO2 Concentration Profiles in Flames Measured by Laster Absorption Tomography," Paper 97-0317, AIAA 35th Aerospace Sciences Meeting, Reno, NV.

Villarreal and Varghese (2005) Applied Optics 44:6786-6795, Frequency-resolved absorption tomography with tunable diode lasers.

Webber et al. (2000) "In Situ Combustion Measurements of CO, CO2, H2O and Temperature Using Diode Laser Absorption Sensors" Proceedings of the Combustion Institute 28:407.

Wolfrum (1998) "Lasers in Combustion: From Basic Theory to Practical Devices" 27th Symposium on Combustion pp. 1-41.

* cited by examiner

METHOD AND APPARATUS FOR SPECTROSCOPIC MEASUREMENTS IN THE COMBUSTION ZONE OF A GAS TURBINE ENGINE

RELATED APPLICATION

This application is a 35 USC §371 of PCT Application Serial No. PCT/US2006/060572, filed Nov. 6, 2006, currently pending, entitled "Method and Apparatus for Spectroscopic Measurements in the Combustion Zone of a Gas Turbine Engine", which claims priority to U.S. Provisional Application No. 60/733,431, filed Nov. 4, 2005, entitled "Technique for Spectroscopic Measurements in the Combustion Zone of Gas Turbine Engines," which are each incorporated herein in their entirety by reference.

TECHNICAL FIELD

The present invention is directed toward a method and apparatus for monitoring and control of a combustion process, and more particularly toward a method and apparatus for spectroscopic measurements in the combustion zone of a gas turbine engine.

BACKGROUND OF THE INVENTION

Laser-based spectroscopic instruments have been implemented in a variety of environments to extract measurement data. Laser-based measurement apparatus can be implemented in situ and offer the further advantage of high speed feedback suitable for dynamic process control. One technique for measuring combustion species such as gas composition, temperature and other combustion parameters (collectively, "combustion properties") utilizes Tunable Diode Laser Absorption Spectroscopy (TDLAS). TDLAS is typically implemented with diode lasers operating in the near-infrared and mid-infrared spectral regions. Suitable lasers have been extensively developed for use in the telecommunications industry and are, therefore, readily available for TDLAS. Various techniques for TDLAS which are more or less suitable for sensing control of combustion processes have been developed. Commonly known techniques are wavelength modulation spectroscopy and direct absorption spectroscopy. Each of these techniques is based upon a predetermined relationship between the quantity and nature of laser light received by a detector after the light has been transmitted through a combustion zone (or combustion chamber) and absorbed in specific spectral bands which are characteristic of the combustion species present in the combustion zone. The absorption spectrum received by the detector is used to determine the combustion properties, including the quantity of the combustion species under analysis and associated combustion parameters such as temperature.

One particularly useful implementation of TDLAS utilizes wavelength-multiplexed diode laser measurements in order to monitor multiple combustion species and combustion parameters. One such system is described in PCT/US2004/010048 (International Publication No. WO 2004/090496) entitled "Method and Apparatus for the Monitoring and Control of Combustion" ("WO '496"), the content of which is incorporated in its entirely herein.

Determining combustion properties can be used to improve combustion efficiency in, for example, gas turbine engines, while simultaneously reducing the harmful emissions such as nitrogen oxides. Monitoring combustion properties within gas turbine engines also has the potential to improve turbine blade lifetime and all other engine components aft of the combustion zone as well as providing a useful diagnostic to identify malfunctioning engines.

While monitoring combustion properties in gas turbine engines would appear to have many potential benefits, making the measurements has proven extremely difficult. The difficulty stems from two major sources. First, the high-pressure and temperature of the combustion zone (30-40 bar, 2200 K) creates an environment in which normal spectral features are highly distorted, leading to difficulty in interpreting data even if it can be obtained. Second, making such measurements in an operating engine requires optical access; that is, a penetration or penetrations in the engine casing through which one can direct a laser beam over a line of sight. This is very difficult to arrange in an operating gas turbine engines due to the harsh nature of the engine environment, the limited space available for monitoring components and the need to minimize impact on critical components.

To illustrate the difficulty of providing line of sight optical access to the combustion zone of a gas turbine engine, FIG. 1 is a schematic view of a gas turbine engine 10 including a combustion zone 12. The combustion zone 12 is defined between a cylindrical outer casing 14 and a cylindrical inner casing 16. A turbine shaft 18 resides within the inner casing 16. The confined area in the vicinity of the combustion zone complicates effective access.

FIG. 2 is a schematic cross-section of the combustion zone 12 taken along lines A-A of FIG. 1. FIG. 2 shows the cylindrical outer casing 14, the cylindrical inner casing 16, the turbine shaft 18 and a number of combustor fuel cups 20 between the inner and outer casings. One possibility for providing line of sight access to the combustion zone is to provide a transmitting optic 22 associated with the borescope port 24 on the outer casing and a receiving optic 26 associated with a port in the inner casing. However, the turbine shaft that is housed in the inner casing prevents any optics from being placed inside the inner casing.

A second possibility is illustrated in FIG. 3, with like reference numbers associated with like elements. Here a line of sight is provided by passing the laser from one borescope inspection port 24A to a second borescope inspection port 24B. In such an embodiment, the line of sight skirts the central inner casing essentially forming a cord 28 through the annular combustion space. While potentially feasible, such a design is problematic because of the high-pressure, high-temperature environment and the difficulty of steering the beam at the severe angle required by the engine geometry.

The present invention is directed toward overcoming one or more of the problems discussed above.

SUMMARY OF THE INVENTION

Figure 1:
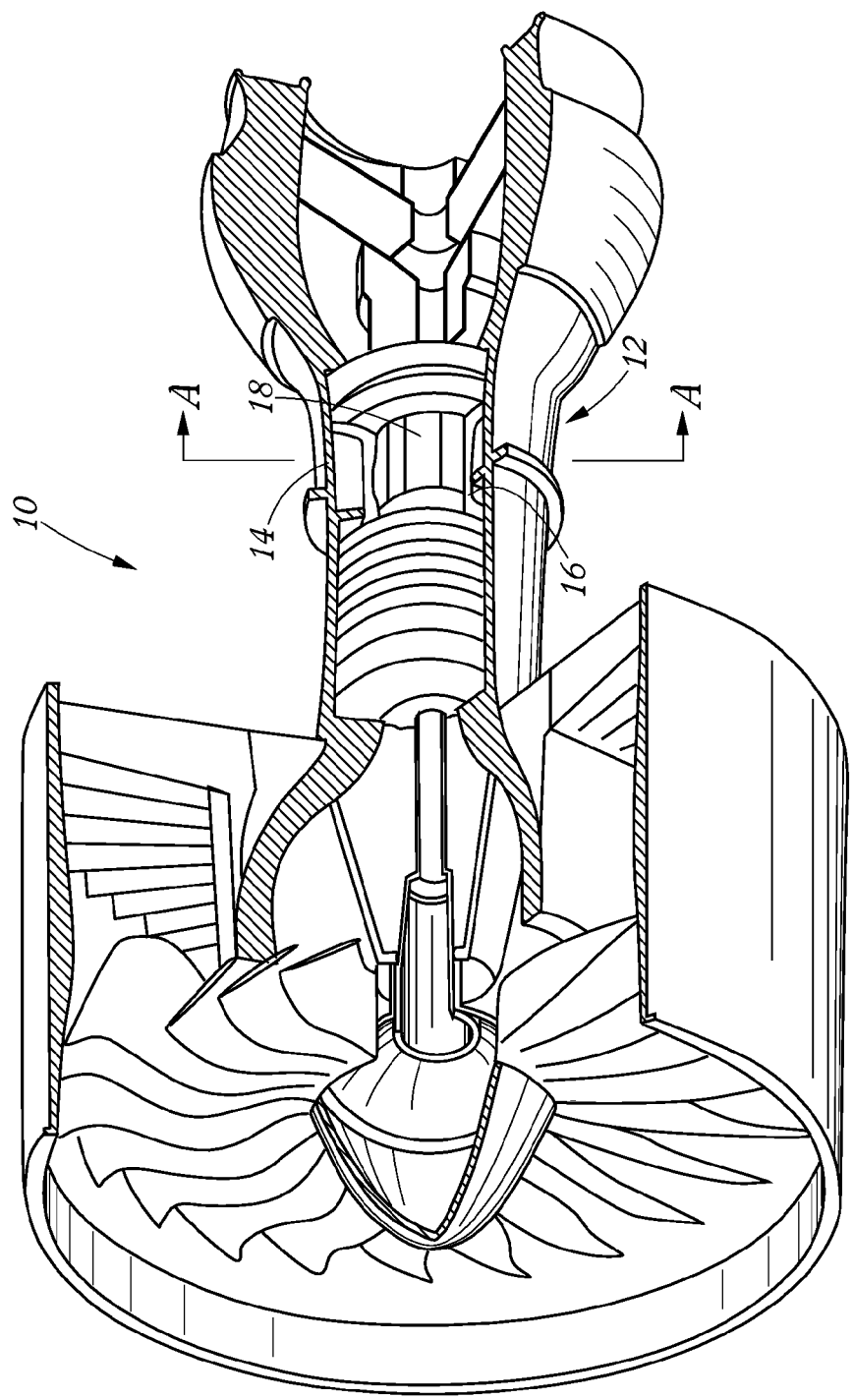
FIG. 1 is a partial sectional view taken along a lengthwise axis of a schematic representation of a gas turbine engine.
Figure 2:
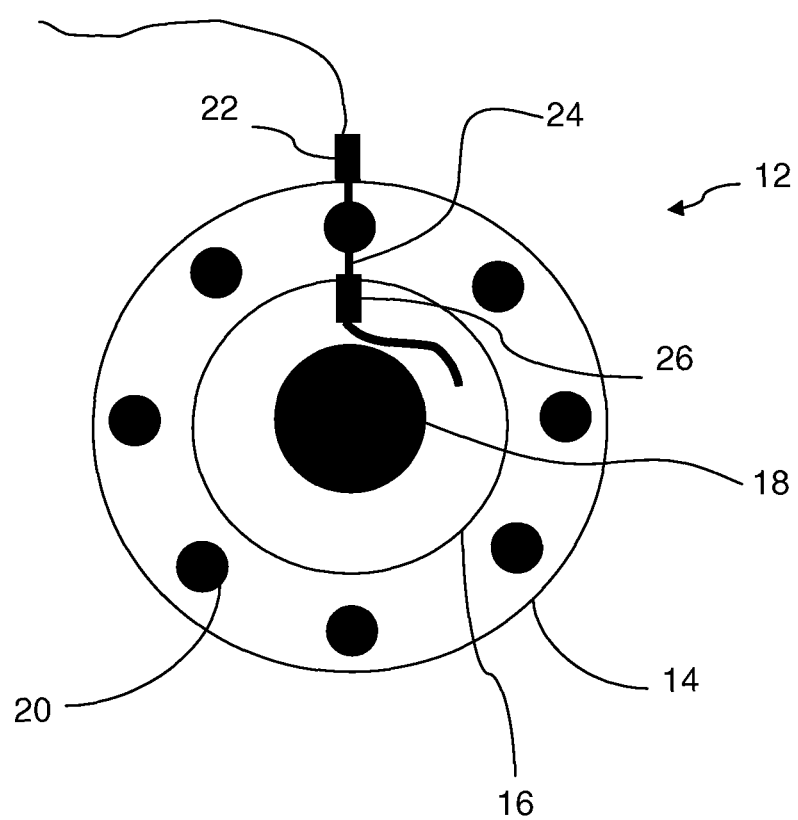
FIG. 2 is a schematic cross-sectional view of the combustion zone of the gas turbine engine of FIG. 1 taken along lines A-A of FIG. 1 illustrating one potential optical coupling of a transmitting/receiving optic pair.

A first aspect of the invention is a method for measuring combustion properties within a combustion zone of a gas turbine engine, the combustion zone being defined between an inner and outer casing. The method comprises transmitting a beam from a transmit optic optically coupled to a port in the outer casing off a portion of the inner casing and receiving a portion of the beam reflected off the inner casing with a receiving optic optically coupled to a port in the outer casing. The transmit optic and the receiving optic may be optically coupled to the same port and the port may be a preexisting borescope port provided in the outer casing by the engine manufacturer to observe a turbine blade during servicing. The transmitting step may include transmitting a beam comprising a plurality of discrete multiplexed wavelengths. In such an embodiment, the method may further include demultiplexing the portion of the beam received by the receiving optic into discrete wavelengths and detecting at least one discrete wavelength of the demultiplexed beam. The method may further include determining the concentration of at least one combustion species based upon the intensity of the at least one detected wavelength. The method may also include determining the concentration of a plurality of combustion species based upon the intensity of a plurality of detected discrete wavelengths of a multiplexed beam. Engine input parameters may be varied in response to select concentrations of the combustion species to affect engine performance. In addition, or alternatively, the concentration of at least one combustion property, such as a combustion species may be monitored to determine an engine malfunction. The method may further include treating a portion of the inner casing to improve its reflectivity.

A second aspect of the present invention is a gas turbine engine comprising a combustion zone between an inner and an outer casing. A port in the outer casing is operatively associated with the combustion zone substantially opposite a portion of the inner casing. A transmitting and receiving pair of optics are optically coupled with the port, with the transmitting and receiving pair of optics being configured so that the transmitting optic transmits a beam off the portion of the inner casing and the receiving optic receives at least a portion of the beam reflected off the portion of the inner casing. The gas turbine engine may further include first and second ports in the outer casing operatively associated with the combustion chamber, the transmitting optic being optically coupled with the first port and the receiving optic being optically coupled with the second port. The portion of the inner casing may be treated to improve its reflectivity.

Yet another aspect of the present invention is an apparatus for measuring combustion parameters of a gas turbine engine, the gas turbine engine having a combustion zone defined between an inner and an outer casing and a port in the outer casing in communication with the inner casing. The apparatus includes a laser generating a beam of a discrete wavelength and a transmitting optic optically coupled to the laser for transmitting the beam. A receiving optic is further provided and the receiving optic and the transmitting optic are configured for operative association with the port in the outer casing of the gas turbine engine, whereby the transmitting optic and the receiving optic are optically coupled by reflecting the beam off the portion of the inner casing. In one embodiment, the system further comprises a plurality of lasers each generating a beam of a discrete wavelength and a multiplexer optically coupled to the plurality of lasers for multiplexing the discrete wavelength beams to a multiplexed beam. The multiplexer is optically coupled to the transmitting optic to convey the multiplexed beam thereto. Such an embodiment may further include a demultiplexer optically coupled to the receiving optic and a detector optically coupled to the demultiplexer for detecting each discrete wavelength beam received by the receiving optic. A computer may be coupled to each detector with the computer being programmed to determine a concentration of at least one combustion species based upon an output of the detectors. The computer may be further programmed to control engine input parameters as a function of the concentration of the at least one combustion species. The computer may be programmed to determine an engine malfunction based upon the concentration of at least one combustion species.

DETAILED DESCRIPTION OF THE INVENTION

Figure 3:
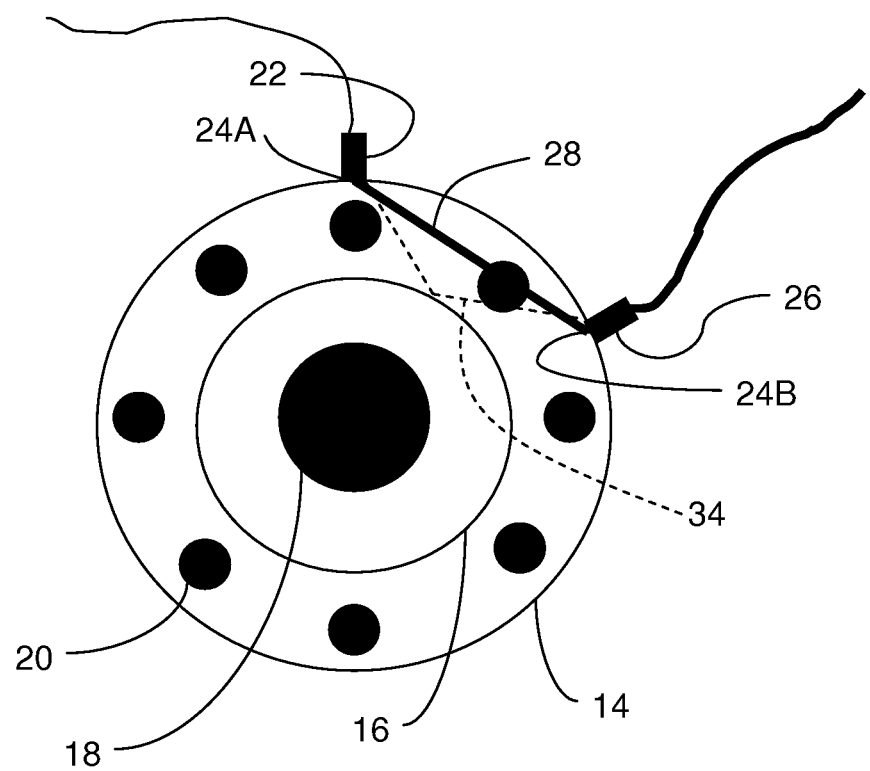
FIG. 3 is similar to FIG. 2 only illustrating a second potential coupling of a transmitting/receiving optic pair.
Figure 4:
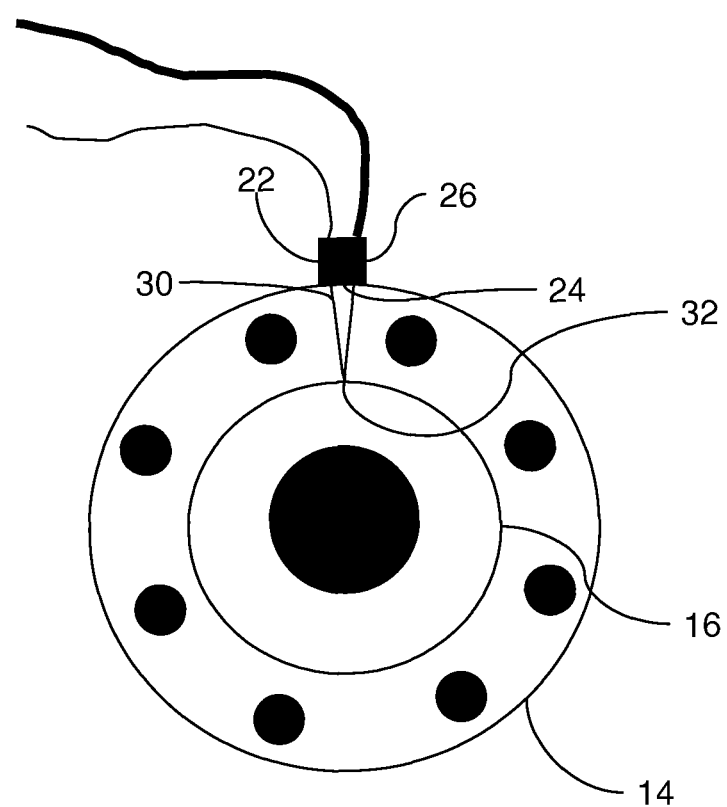
FIG. 4 is similar to FIG. 2 only illustrating coupling of a transmitting/receiving optic pair configured in accordance with the present invention.

FIG. 1, which is described briefly above depicts in schematic form a partial sectional view taken along an axis of a gas turbine engine 10 illustrating the combustion chamber 12. FIG. 4 is a cross-section view taken along lines A-A of FIG. 1 illustrating in schematic form the operative association of a transmitting optic 22 and a receiving optic 26 pair in accordance with the present invention. In the embodiment illustrated in FIG. 4, the transmitting/receiving optics pair 22, 26 are optically coupled to a port 24 in an outer casing 14 and physically secured to the outer casing. The port 24 may be a borescope port which is a penetration in the outer casing available near the combustion zone on many modern gas turbine engines. The borescope ports are intended to allow observations of the turbine blade during servicing, but are further intended to be accessible only when the engine is not running. Thus, these ports typically are plugged during engine operation. The transmitting/receiving optics pair 22, 26 are secured to the port 24 and the outer casing in a manner enabling them to function as the plug they replace. The transmitting/receiving optics pair 22, 26 are configured for operative association with the port 24 in the outer casing of the gas turbine so that the transmitting optic and the receiving optic are optically coupled by reflecting the beam 30 off a portion 32 of the inner casing 16 substantially opposite the port 24. As used herein, "substantially opposite" means positioned so that light reflects off the portion 32 of the inner casing in a near-specular manner between the transmitting/receiving optics pair. In this manner, a line of sight between the transmitting optic 22 and the receiving optic 26 can be achieved in the combustion zone of the gas turbine engine with minimal intrusion. In an alternative embodiment illustrated in FIG. 3, the transmitting optic 22 may direct the beam 34 illustrated in phantom lines off the inner casing to a receiving optic 26 associated with a distinct port. In such an embodiment the portion 36 of the inner casing upon which the beam is reflected would be between the transmitting/receiving optics 22, 26.

Returning to the embodiment illustrated in FIG. 4, the beam 30 is reflected off the portion 32 of the inner casing 16 in a near-specular manner so that it nearly retraces its path to the receiving optic 26 located in close proximity to the transmitting optic. The portion 32 of the inner casing may be polished or coated in some manner to increase the reflectivity of the portion 32 of the inner casing. The size of the portion may vary in accordance with tolerances, but a section as small as 5 mm in diameter may be sufficient to significantly improve the optical transmission. In addition or as an alternative to polishing a portion of the inner casing, a coating of a highly reflective material may be applied to the portion 32 of the inner casing. Alternatively or in addition, the portion 32 of the inner casing may be treated to resist collection of soot deposits. All manner of treating the portion 32 of the inner casing to improve reflectivity and minimize soot deposition are with the scope of the invention.

Figure 5:
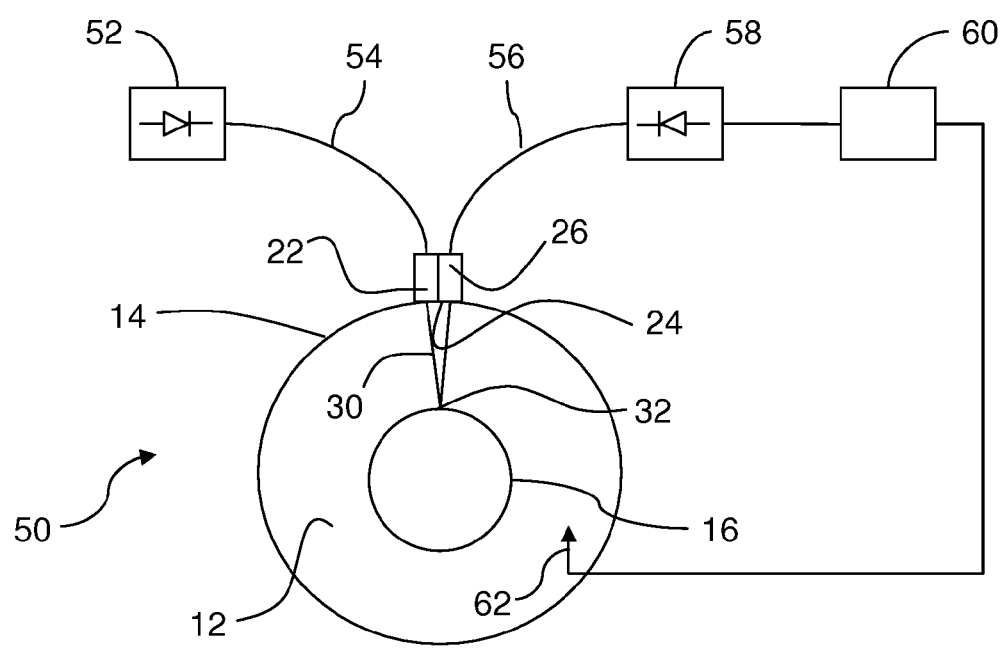
FIG. 5 is a schematic representation of an embodiment of an apparatus for measuring combustion parameters within a combustion zone of a gas turbine engine in accordance with the present invention using a single wavelength beam input.

FIG. 5 illustrates schematically one embodiment of the present invention in the form of a system or sensing apparatus 50 for sensing, monitoring and control of a combustion process. The apparatus 50 comprises a tunable diode laser 52 that is optically coupled to an individual optical fiber 54 which may be a single mode optical fiber. The optical fiber 54 is further optically coupled to a transmitting optic 22 which may include a collimating lens or other optics suitable for producing a collimated transmitted beam 30. As used herein, "coupled" or "optically coupled" or "in optical communication with" is defined as a functional relationship between counterparts where light can pass from a first component to a second component either through or not through intermediate components or free space. The transmitting optic 22 and the receiving optic 26 are optically coupled to a port 24 in the cylindrical outer casing 14, whereby the beam 30 is transmitted off a portion 32 of the inner casing 16 to be received by the receiving optic 26. As depicted in FIG. 5, the portion 32 of the inner casing may be substantially opposite the port 24. The portion 32 may be treated to improve reflectivity or minimize soot collection as discussed above with respect to FIG. 4. The receiving optic 26 is optically coupled to a optical fiber 56, which may be a multi-mode optical fiber. Optical fiber 56 is optically coupled to a detector 58, which typically is a photodetector sensitive to the frequency of laser light generated by laser 52. The detector 58 generates an electrical signal based upon the nature and quantity of light transmitted to the detector 58. The electrical signal from the detector 58 is digitized and analyzed in a computer or data processing system 60. The computer 60 is programmed to determine a combustion property, such as a concentration of at least one combustion species, based upon the output of the detector. The computer may further be programmed to control engine input parameters such as air and fuel provided to the combustion zone as a function of the concentration of the combustion species, as illustrated by the arrow 62. Alternatively, or in combination, the computer 60 may be programmed to determine an engine malfunction based upon the concentration of a combustion species and produce a warning signal.

The invention contemplates the use of fiber optic coupling to the electronic and optical components on both the transmitting and receiving sides of the sensing apparatus 50 to allow delicate temperature sensitive apparatus such as the tunable diode laser 52, the detector 58 and the data processing system or computer 60 to be located in a suitable operating environment away from the gas turbine engine. Thus, only the relatively robust transmitting and receiving optics 22, 26 need to be situated near the hostile environment of the combustion chamber 12.

Figure 6:
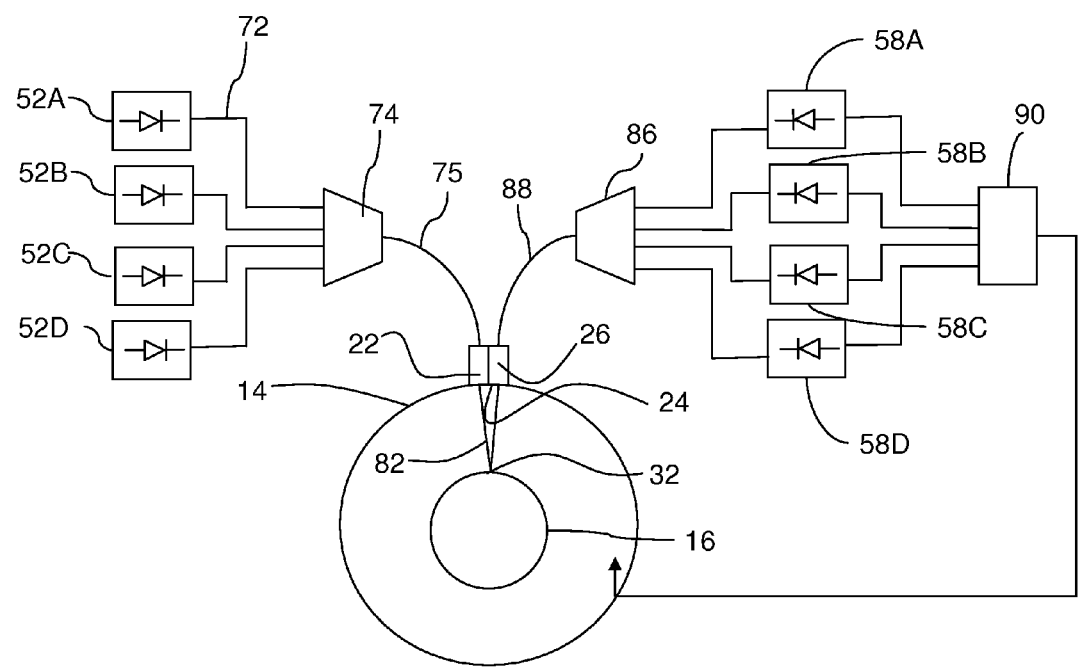
FIG. 6 is a schematic representation of an embodiment of an apparatus for measuring combustion parameters within a combustion zone of a gas turbine engine in accordance with the present invention using a multiplexed beam input.

FIG. 6 schematically illustrates a multiplexed sensing apparatus 70 in accordance with the present invention. Like reference numbers refer to the same elements as FIG. 5. In this embodiment a plurality of tunable diode lasers 52A-52D are optically coupled to an optical fiber 72 (which may be a single mode optical fiber) and routed to a multiplexer 74. Within the multiplexer 74 laser light from some or all of the diode lasers 12A-12D is multiplexed to form a multiplexed beam having multiple select frequencies. The multiplexed beam is optically coupled to an optical fiber 75 and transmitted to the transmitting optic 22. A receiving optic 26 forms a transmitting/receiving optics pair with the transmitting optic 22. The transmitting/receiving optics pair 22, 26 are optically coupled to a port 24 in an outer cylindrical casing 14 of a gas turbine engine, as described with respect to FIG. 5. As with FIG. 5, the beam 82, which in this case is a multiplexed beam, is reflected off a portion 32 of the inner casing 16 for receipt by the receiving optic 26. The receiving optic 26 optically communicates with a demultiplexer 86 by means of optical fiber 88. The demultiplexer 86 demultiplexes multiplexed beams to discrete wavelengths and each wavelength is optically communicated to a corresponding detector 58A-58D, which in turn is coupled to the data processor or computer 90, which may be programmed as discussed above with respect to the computer 60 of FIG. 6.

The embodiment illustrated in FIG. 6 may include any number of tunable diode lasers 52A-52D generating a variety of wavelengths, though only four are illustrated for the sake of simplicity. A like number of photodiode detectors 58 are provided.

The multiplexer 74 and demultiplexer 86 may be components designed for use it the telecommunications industry. Suitable multiplexers/demultiplexers are described in greater detail in WO '496, referenced above. Other aspects of the method and apparatus for the monitoring and control of combustion described in WO '496 may be included with the apparatus described in FIGS. 5 and 6 as necessary or desired. For example, using multiple sets of transmitting/receiving optics pairs and optical switches and/or routers to provide a beam of multiplexed light to each pair and for providing the beam to the detectors may be useful, particularly for a tomographic representation of combustion properties wherein the combustion zone.

In use, the surface of the inner casing may degrade over time due to deposition of carbonations material (essentially soot). It is anticipated that even with a fouled inner casing in which the reflectivity of the surface will degrade and become more highly scattered, approximately one part per million of the light will remain detectable. In this event, the measurement becomes more like a LIDAR (Laser Radar) in which back scattered laser light is observed from the inner casing surface instead of specular reflection. However, with the addition of laser modulation and frequency lock-in techniques as well as more efficient avalanche photodiode detectors, it is believed that these LIDAR-type measurements will be adequate for monitoring of combustion species.

EXAMPLE

The following example is provided for illustrative purposes only and is not intended to limit the scope of the invention.

Figure 7:
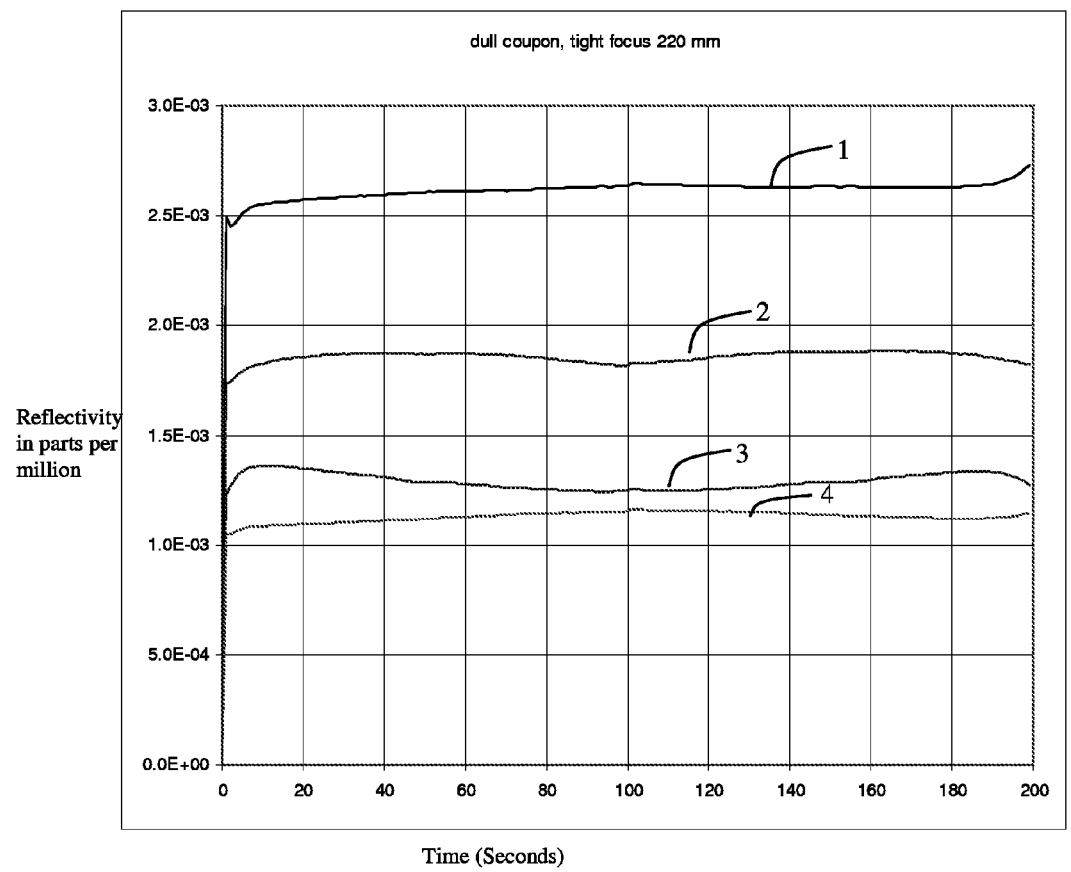
FIG. 7 is a graph of reflected signal versus time at four different wavelengths between 1348-1559 nm measured in one example in accordance with the present invention.

Data was collected from a transmitting/receiving pair of optics associated with a portion of an inner casing. In this example, the portion of the inner casing which the beam was directed to had been bead-blasted, which produces a higher degree of scattering than a typical inner casting of an engine would provide. Four wavelengths were multiplexed onto a single mode fiber, collimated and then directed by a transmit optic onto the bead blasted portion of the inner casing. The receiving optic was positioned to catch the specular reflection from the portion of the inner casing. FIG. 7 is a table setting forth the reflecting data collected. The multiplexed wavelength beams were at the following wavelengths: 1=1348 nm;

2=1376 nm; 3=1394 nm and 4=1559 nm. These wavelengths were chosen as being useful for measuring combustion species such as water ($H_2O$), carbon dioxide ($CO_2$) and carbon monoxide (CO). Even with the bead-blasted, highly scattering material, FIG. 7 illustrates between 1000-2500 parts per million (0.1-0.25%) of the transmitted beam being received by the receiving optic. By way of comparison, the light captured using a polished portion 32 of the inner casing was determined. The polished sample provided a reflectivity of approximately 200,000 parts per million, or approximately 20%. This example suggests that sufficient light from a beam can be transmitted to the receiving optic to enable measurement of combustion species.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

What is claimed is:

1. A method of measuring combustion properties within a combustion zone of a gas turbine engine, the combustion zone being defined between an inner and an outer casing and a turbine shaft residing within the inner casing, the method comprising:
   a) treating a portion of the inner casing to produce a higher degree of scattering of a transmitted beam;
   b) transmitting the beam from a transmit optic optically coupled to a first port in the outer casing through the combustion zone off the treated portion of the inner casing;
   c) receiving a portion of the beam reflected off the treated portion of the inner casing with a receiving optic optically coupled to the first port or a second port in the outer casing; and
   d) measuring the intensity of the portion of the beam received by the receiving optic.

2. The method of claim 1 wherein the transmit optic and the receiving optic are optically coupled to the first port.

3. The method of claim 2 wherein the first port is a preexisting borescope port provided by the engine manufacturer to observe a turbine blade during servicing.

4. The method of claim 1 further comprising in step b), the beam comprising a plurality of discrete multiplexed wavelengths.

5. The method of claim 4 wherein step d) further comprises:
   d1) demultiplexing the portion of the beam received by the receiving optic into discrete wavelengths; and
   d2) measuring at least one discrete wavelength of the demultiplexed beam.

6. The method of claim 5 further comprising:
   d3) determining the concentration of at least one combustion species based upon the intensity of the at least one measured wavelength.

7. The method of claim 6 further comprising in step d3), determining the concentration of a plurality of combustion species based upon the intensity of a plurality of measured discrete wavelengths.

8. The method of claim 7 further comprising:
   e) altering engine input parameters in response to select concentrations of the combustion species.

9. The method of claim 6 further comprising monitoring the concentration of the at least one combustion species to determine engine malfunction.

10. A gas turbine engine comprising:
    a combustion zone between an inner and outer casing with a turbine shaft residing within the inner casing;
    at least one port in the outer casing operatively associated with the combustion zone substantially opposite a portion of the inner casing; and
    a transmitting and receiving pair of optics optically coupled with the at least one port, the transmitting and receiving pair of optics being configured so that the transmitting optic transmits a beam off the portion of the inner casing and the receiving optic receives at least a portion of the beam reflected off the portion of the inner casing; and
    wherein the portion of the inner casing is treated to produce a higher degree of scattering of the transmitted beam.

11. The gas turbine engine of claim 10 further comprising the at least one port comprising first and second ports in the outer casing operatively associated with the combustion zone, the transmitting optic being optically coupled with the first port and the receiving optic being optically coupled with the second port.

12. An apparatus for measuring combustion parameters of a gas turbine engine, the apparatus comprising:
    a combustion zone defined between an inner and an outer casing, a first port in the outer casing;
    a laser generating a beam of light;
    a transmitting optic optically coupled to the laser transmitting the beam; and
    a receiving optic, the receiving optic and the transmitting optic being configured for operative association with the first port or a second port in the outer casing of the gas turbine engine, the transmitting optic and the receiving optic being optically coupled by reflecting the beam off a portion of the inner casing; and
    the portion of the inner casing being treated to produce a higher degree of scattering of the transmitted beam.

13. The apparatus of claim 12 further comprising:
    a plurality of lasers each generating a beam of a discrete wavelength; and
    a multiplexer optically coupled to the plurality of lasers for multiplexing the discrete wavelength beams into a multiplexed beam, the multiplexer being optically coupled to the transmitting optic.

14. The apparatus of claim 13 further comprising:
    a demultiplexer optically coupled to the receiving optic; and
    a detector optically coupled to the demultiplexer for detecting each discrete wavelength beam received by the receiving optic.

15. The apparatus of claim 14 further comprising a computer coupled to each detector, the computer being programmed to determine a concentration of at least one combustion species based upon an output of the detectors.

16. The apparatus of claim 15 further comprising the computer being programmed to control engine input parameters as a function of the concentration of the at least one combustion species.

17. The apparatus of claim 16 wherein the computer is programmed to determine engine malfunction based upon the concentration of the at least one combustion species.

* * * * *